(12) United States Patent
Mori et al.

(10) Patent No.: US 8,045,426 B2
(45) Date of Patent: Oct. 25, 2011

(54) OPTICAL HEAD DEVICE, AND RECORDING AND/OR REPRODUCING DEVICE

(75) Inventors: Eishin Mori, Kyoto (JP); Kousei Sano, Osaka (JP); Joji Anzai, Osaka (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 12/602,718

(22) PCT Filed: May 29, 2008

(86) PCT No.: PCT/JP2008/001347
§ 371 (c)(1),
(2), (4) Date: Dec. 2, 2009

(87) PCT Pub. No.: WO2008/149522
PCT Pub. Date: Dec. 11, 2008

(65) Prior Publication Data
US 2010/0254236 A1 Oct. 7, 2010

(30) Foreign Application Priority Data
Jun. 5, 2007 (JP) ................................. 2007-148906

(51) Int. Cl.
*G11B 7/00* (2006.01)
(52) U.S. Cl. .................................................. 369/44.23
(58) Field of Classification Search .................. None
See application file for complete search history.

(56) References Cited

U.S. PATENT DOCUMENTS

| | | | |
|---|---|---|---|
| 6,807,017 B2 * | 10/2004 | Sasano et al. ................. 359/719 |
| 6,992,966 B2 * | 1/2006 | Yamamoto et al. ....... 369/112.02 |
| 7,068,445 B2 * | 6/2006 | Hayashi et al. ............... 359/719 |
| 7,471,611 B2 * | 12/2008 | Okamura ................. 369/112.08 |
| 2002/0036958 A1 * | 3/2002 | Wada et al. ................. 369/44.23 |
| 2006/0002279 A1 * | 1/2006 | Okamura ................. 369/112.23 |
| 2006/0028935 A1 | 2/2006 | Mori et al. |
| 2006/0104180 A1 * | 5/2006 | Mori et al. ..................... 369/94 |
| 2006/0203302 A1 * | 9/2006 | Hendriks et al. ............. 358/484 |
| 2007/0053255 A1 * | 3/2007 | Atarashi et al. ........... 369/44.23 |
| 2008/0219131 A1 | 9/2008 | Hendriks et al. |
| 2009/0080298 A1 * | 3/2009 | Yamasaki et al. .......... 369/44.23 |
| 2010/0254236 A1 * | 10/2010 | Mori et al. ................. 369/47.49 |

FOREIGN PATENT DOCUMENTS

| | | |
|---|---|---|
| JP | 11-259906 | 9/1999 |
| JP | 2006-120283 | 5/2006 |
| JP | 2006-164493 | 6/2006 |
| WO | 2005/020219 | 3/2005 |
| WO | 2005/078712 | 8/2005 |

OTHER PUBLICATIONS

International Search Report issued Sep. 2, 2008 in International (PCT) Application No. PCT/JP2008/001347.
Noboru Murayama et al., "Optical Disk Technology", published by Radio Technology Publications, Inc., Jan. 1989, p. 60 (along with partial translation).

* cited by examiner

*Primary Examiner* — Peter Vincent Agustin
(74) *Attorney, Agent, or Firm* — Wenderoth, Lind & Ponack, L.L.P.

(57) ABSTRACT

An object of the invention is to suppress an influence of a wavefront aberration which is generated at the time of correcting a third-order spherical aberration, and realize satisfactory information recording and/or reproducing. A collimator lens 4 corrects a third-order spherical aberration which is generated depending on the thickness of a light transmissive layer from a surface of a first optical information recording medium 30, corresponding to an optimal substrate thickness of a first objective lens 6, to an intended information recording surface, assuming that the light transmissive layer thickness of the first optical information recording medium 30 which minimizes a residual third-order spherical aberration at the time of incidence of parallel light into the first objective lens 6 is defined as the optimal substrate thickness of the first objective lens 6. The optimal substrate thickness of the first objective lens 6 is defined in such a manner that a variation of a wavefront aberration which is generated on the information recording surface of the first optical information recording medium 30 farthest from the first objective lens 6 at the time of correcting the third-order spherical aberration, and a variation of a wavefront aberration which is generated on the information recording surface of the first optical information recording medium 30 closest to the first objective lens 6 at the time of correcting the third-order spherical aberration are set equal to each other.

7 Claims, 9 Drawing Sheets

OPTICAL HEAD DEVICE, AND RECORDING AND/OR REPRODUCING DEVICE

TECHNICAL FIELD

The present invention relates to an optical head device for use in information recording and/or reproducing information with respect to an optical information recording medium such as an optical disc, and a recording and/or reproducing device provided with the optical head device.

BACKGROUND ART

There has been known an optical information recording medium called as a DVD or a BD (a Blu-ray disc) among the commercially available high-density and large-capacity optical information recording media. In recent years, the optical information recording medium has been rapidly spread as a recording medium for recording images, music, and computer-processed data.

As the capacity of an optical information recording medium has been increased, a short-wavelength light source and an objective lens having a large NA to be used in an optical head device have been developed. As the NA is increased, however, a change in a spherical aberration resulting from a change in thickness of a light transmissive layer of an optical information recording medium is increased. For instance, in the case where a light source for emitting light of 650 nm wavelength, and an objective lens having an NA of 0.6 are used in information recording and/or reproducing with respect to a DVD, a spherical aberration of about 10 m$\lambda$ is generated with respect to a change in light transmissive layer thickness of 10 µm. In the case where a light source for emitting light of 400 nm wavelength, and an objective lens having an NA of 0.85 are used in information recording and/or reproducing with respect to a BD as a next-generation optical information recording medium, a spherical aberration of about 100 m$\lambda$ is generated with respect to a change in light transmissive layer thickness of 10 µm. Thus, a spherical aberration of about ten times of a spherical aberration in a DVD is generated in a BD. In view of this, a measure for correcting spherical aberration is necessary in the aforementioned optical head device.

For instance, patent literature 1 proposes an approach, wherein a collimator lens disposed between a light source and an objective lens is mounted on a collimator lens actuator, and the collimator lens is moved in such a direction as to cancel a spherical aberration resulting from a thickness error of a light transmissive layer. The approach is described in detail referring to FIG. 8.

FIG. 8 is a schematic construction diagram of a conventional optical head device. Referring to FIG. 8, the optical head device 120 includes a light source 101, a beam splitter 102, a quarter wavelength plate 103, a collimator lens 104, an objective lens 106, a multi lens 107, a photodetector 108, a two-axis actuator 109 for driving the objective lens 106, and a collimator lens actuator for driving the collimator lens 104.

Laser light emitted from the light source 101 is transmitted through the beam splitter 102, and incident into the collimator lens 104. The laser light incident into the collimator lens 104 is collimated into parallel light by the collimator lens 104, if the thickness of a light transmissive layer 131 of an optical information recording medium 130 is set to a defined value. The collimator lens 104 is mounted on the collimator lens actuator 110, and is movable in forward or backward direction along an optical axis of laser light by the collimator lens actuator 110.

The laser light transmitted through the collimator lens 104 is turned into circularly polarized light while being transmitted through the quarter wavelength plate 103, and incident into the objective lens 106. The laser light collected by the objective lens 106 and incident into an information recording surface of the optical information recording medium 130 is turned into return light by reflection on the information recording surface. After the return light is transmitted through the objective lens 106 along an incoming optical path, the return light is incident into the quarter wavelength plate 103. The return light is then turned into linearly polarized light, which is rotated by 90 degrees with respect to the polarization direction of the incoming path, by transmission through the quarter wavelength plate 103. Thereafter, the return light is turned into convergent light by the collimator lens 104, and then reflected on the beam splitter 102. The return light reflected on the beam splitter 102 is incident into the photodetector 108 through the multi lens 107, and detected by the photodetector 108.

In the case where information recording/reproducing is performed by collecting light on the information recording surface of the optical information recording medium 130, using the optical head device 120, there are generated mainly two kinds of spherical aberrations resulting from a thickness error of the light transmissive layer 131 of the optical information recording medium 130, i.e., aberration due to defocus, and spherical aberration. The aberration due to defocus is corrected by focus servo control. Specifically, the aberration due to defocus is corrected by moving the objective lens 106 in the optical axis direction by the two-axis actuator 109, based on a focus servo signal from the photodetector 108, whereby the laser light is focused on the information recording surface.

On the other hand, the spherical aberration is corrected by turning laser light to be incident into the objective lens 106 into divergent light or convergent light, and generating a spherical aberration having a polarity opposite to the polarity of a spherical aberration which is generated depending on the thickness of the light transmissive layer 131. Specifically, laser light to be incident into the objective lens 106 is turned into divergent light or convergent light by moving the collimator lens 104 in forward or backward direction along the optical axis direction by the collimator lens actuator 109 to generate a spherical aberration having an opposite polarity by the objective lens 106, whereby a spherical aberration resulting from a thickness error of the light transmissive layer 131 is cancelled. In this way, in the conventional optical head device 120, a spherical aberration is cancelled when laser light is focused on the information recording surface through the objective lens 106.

There is proposed an idea of forming a multilayer structure of information recording surfaces to further increase the capacity of an optical information recording medium. In the case where a multilayer structure of information recording surfaces is formed, information recording and/or reproducing is performed with respect to plural information recording surfaces. However, since the distance from the objective lens 106 differs with respect to the information recording surfaces, a spherical aberration is generated on an information recording surface displaced from an optical transmissive layer thickness of an optical information recording medium, which minimizes a residual aberration at the time of parallel light incidence, in other words, an optimal substrate thickness of the objective lens 106, depending on a light transmissive layer thickness $\Delta d$ from an optimal position which minimizes a residual aberration to an intended information recording surface. A third-order spherical aberration W is expressed by the following formula (1), where Δd is a light transmissive layer thickness from an optimal position which minimizes a residual aberration to an intended information recording surface, n is a refractive index of a light transmissive layer, and NA is a numerical aperture of an objective lens (see e.g. non-patent literature 1).

$$W = \frac{n^2-1}{8n^3}(NA)^4 \Delta d \quad (1)$$

As described in the above formula (1), the third-order spherical aberration W is increased in proportion to the light transmissive layer thickness Δd from an optimal position which minimizes a residual aberration to an intended information recording surface. In other words, in the case where a multilayer structure is formed of information recording surfaces, as the light transmissive layer thickness is greatly changed, a spherical aberration amount to be corrected is also increased. As a result, in the conventional optical head device 120, the moving range of the collimator lens 104 is exceedingly increased. As the moving range of the collimator lens 104 is increased, and a degree of convergence/divergence of laser light to be incident into the objective lens 106 is increased, a fifth-order spherical aberration is generated in the objective lens 106.

For instance, let it be assumed that the wavelength λ of a light source is 405 nm, the NA of an objective lens is 0.85, the focal length of the objective lens is 1.3 mm, the focal length of a collimator lens is 19.0 mm, and the optimal substrate thickness of the objective lens (corresponding to a light transmissive layer thickness of an optical information recording medium which minimizes a residual aberration at the time of parallel light incidence) is 87.5 μm. FIG. 9 shows the amount of fifth-order spherical aberration which is generated at the time of correcting a third-order spherical aberration resulting from a change in the light transmissive layer thickness by moving the collimator lens in the above arrangement. As shown in FIG. 9, in an optical information recording medium whose light transmissive layer thickness is changed from 25 μm to 100 μm, even if the third-order spherical aberration is corrected, the amount of fifth-order spherical aberration as a residual aberration becomes maximally 40 mλ. Thus, an influence of a fifth-order spherical aberration in information recording and/or reproducing is not negligible.

Patent literature 1: JP Hei 11-259906A

Non-patent literature 1: "Optical Disk Technology" by Noboru Murayama, Kazusa Yamada, Hiroshi Koide, and Makoto Kunikane, published by Radio Technology Publications Inc., January 1989, p. 60

DISCLOSURE OF THE INVENTION

In view of the above, it is an object of the present invention to provide an optical head device, and a recording and/or reproducing device that enable to suppress an influence of a wavefront aberration which is generated at the time of correcting a third-order spherical aberration, and perform satisfactory information recording and/or reproducing.

An optical head device according to an aspect of the invention is an optical head device for use with an optical information recording medium having at least three information recording surfaces to be recorded with an information signal. The optical head device includes: a light source for emitting a light beam; an objective lens for collecting the light beam emitted from the light source on the optical information recording medium; and an aberration corrector disposed between the light source and the objective lens, and for correcting a third-order spherical aberration which is generated depending on a thickness of a light transmissive layer from a surface of the optical information recording medium, corresponding to an optimal substrate thickness of the objective lens, to an intended information recording surface, assuming that the light transmissive layer thickness of the optical information recording medium which minimizes a residual third-order spherical aberration at the time of incidence of parallel light into the objective lens is defined as the optimal substrate thickness of the objective lens. The optimal substrate thickness of the objective lens is defined in such a manner that a variation of a wavefront aberration which is generated on the information recording surface of the optical information recording medium farthest from the objective lens at the time of correcting the third-order spherical aberration, and a variation of a wavefront aberration which is generated on the information recording surface of the optical information recording medium closest to the objective lens at the time of correcting the third-order spherical aberration are set equal to each other.

According to the invention, the optimal substrate thickness of the objective lens is defined in such a manner that a variation of a wavefront aberration which is generated on the information recording surface of the optical information recording medium farthest from the objective lens at the time of correcting the third-order spherical aberration, and a variation of a wavefront aberration which is generated on the information recording surface of the optical information recording medium closest to the objective lens at the time of correcting the third-order spherical aberration are set equal to each other. Accordingly, an influence of a wavefront aberration which is generated at the time of correcting a third-order spherical aberration can be suppressed, and satisfactory information recording and/or reproducing can be performed.

These and other objects, features and advantages of the present invention will become more apparent upon reading the following detailed description along with the accompanying drawings.

BEST MODE FOR CARRYING OUT THE INVENTION

Figure 1:
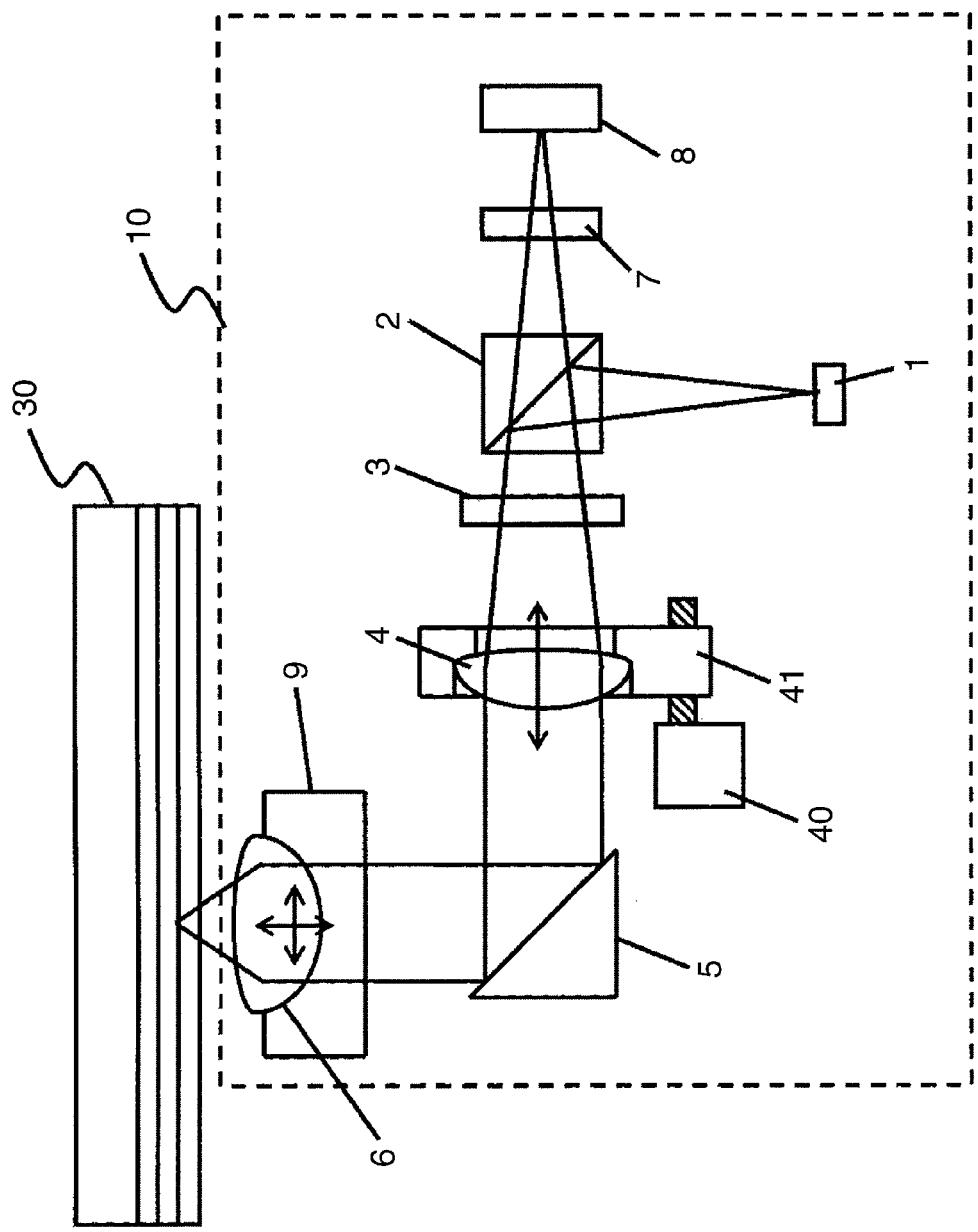
FIG. 1 is a schematic construction diagram of an optical head device in a first embodiment of the invention.

In the following, embodiments of an optical head device, and a recording and/or reproducing device of the invention are described referring to the accompanying drawings. Elements having like reference numerals throughout the drawings indicate identical elements or elements having like functions and operations. The following embodiments are merely examples embodying the invention, and do not limit the technical scope of the invention.

First Embodiment

Figure 2:
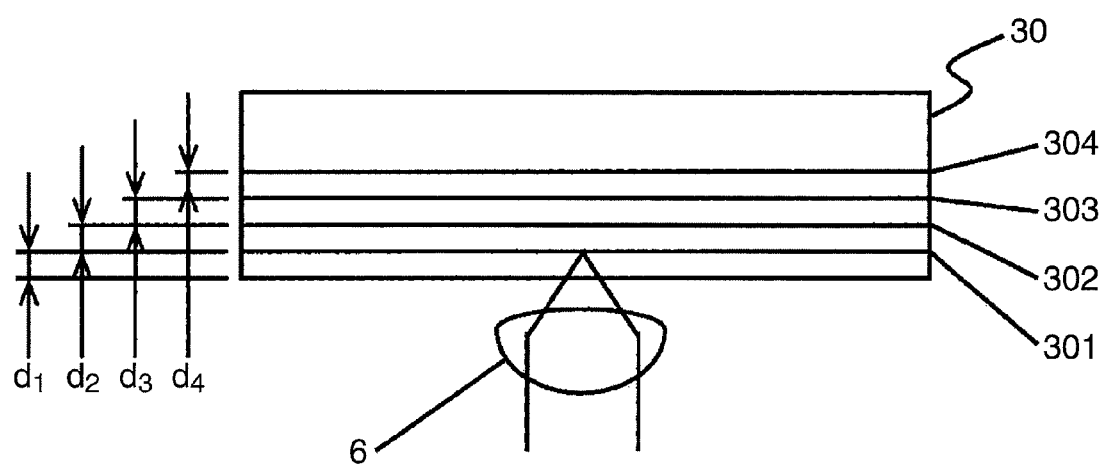
FIG. 2 is a schematic construction diagram of an optical information recording medium in the first embodiment of the invention.

FIG. 1 is a schematic construction diagram of an optical head device in the first embodiment of the invention. FIG. 2 is a schematic construction diagram of an optical information recording medium in the first embodiment of the invention.

Referring to FIG. 1, an optical head device 10 includes a semiconductor laser 1 as a light source, a beam splitter 2, a quarter wavelength plate 3, a collimator lens 4, a reflection mirror 5, a first objective lens 6, a detection lens 7, a photodetector 8, a two-axis actuator 9 for driving the first objective lens 6, a stepping motor 40 for driving the collimator lens 4, and a lens holder 41 for holding the collimator lens 4.

A first optical information recording medium 30 has a transparent substrate, and at least three information recording surfaces to be recorded with an information signal. As shown in FIG. 2, the first information recording medium 30 is formed with plural information recording surfaces 301, 302, 303, and 304 in this order from the side of a light incident surface (the side of the first objective lens 6). In this embodiment, the thickness of a light transmissive layer from the light incident surface of the first optical information recording medium 30 to the information recording surface 301 is defined as $d_1$, the thickness of a light transmissive layer between the information recording surface 301 and the information recording surface 302 is defined as $d_2$, the thickness of a light transmissive layer between the information recording surface 302 and the information recording surface 303 is defined as $d_3$, and the thickness of a light transmissive layer between the information recording surface 303 and the information recording surface 304 is defined as $d_4$.

The semiconductor laser 1 emits a light beam (laser light) having e.g. 405 nm wavelength. The first objective lens 6 collects the light beam emitted from the semiconductor laser 1 on the first optical information recording medium 30.

The collimator lens 4 is disposed between the semiconductor laser 1 and the first objective lens 6, and corrects a third-order spherical aberration which is generated depending on the thickness of a light transmissive layer from the surface of the first optical information recording medium 30, corresponding to an optimal substrate thickness of the first objective lens 6, to an intended information recording surface, assuming that the light transmissive layer thickness of the first optical information recording medium 30 which minimizes a residual third-order spherical aberration at the time of incidence of parallel light into the first objective lens 6 is defined as the optimal substrate thickness of the first objective lens 6.

The semiconductor laser 1 corresponds to an example of a light source, the first optical information recording medium 30 corresponds to an example of an optical information recording medium, the first objective lens 6 corresponds to an example of an objective lens, and the collimator lens 4 corresponds to an example of an aberration corrector.

In the following, an operation of the optical head device 10, in the case where information recording and/or reproducing is performed on or from the first optical information recording medium 30, is described. Linearly polarized laser light emitted from the semiconductor laser 1 is reflected on the beam splitter 2, converted into circularly polarized light by the quarter wavelength plate 3, and converted into parallel light by the collimator lens 4. The laser light converted into parallel light is reflected on the reflection mirror 5, and incident into the first objective lens 6. The laser light incident into the first objective lens 6 is collected as a light spot on either one of the information recording surfaces 301 through 304 of the first optical information recording medium 30 through the transparent substrate.

The laser light reflected on either one of the information recording surfaces 301 through 304 is then transmitted through the first objective lens 6, reflected on the reflection mirror 5, transmitted through the collimator lens 4, and converted into linearly polarized light along an optical path different from an incoming path by the quarter wavelength plate 3. Thereafter, the laser light is transmitted through the beam splitter 2, and guided to the photodetector 8 through the detection lens 7.

The laser light detected by the photodetector 8 is subjected to photoelectric conversion and computation, thereby generating a focus error signal for use in following a plane displacement of the first optical information recording medium 30, and a tracking error signal for use in following decentering of the first optical information recording medium 30. The two-axis actuator 9 drives the first objective lens 6 in two axis directions so that a light spot follows an information track of the rotating first optical information recording medium 30, based on the focus error signal and the tracking error signal.

The collimator lens 4 is held on the lens holder 41, and is movable along the optical axis of laser light by the stepping motor 40. Further, in the case where the thickness of each of the light transmissive layers of the information recording surfaces 301 through 304 is out of a defined value, the collimator lens 4 converts laser light into divergent light or convergent light to correct a spherical aberration resulting from a change in the light transmissive layer thickness in accordance with the thickness of each light transmissive layer. As a result of this operation, a spherical aberration having an opposite polarity is generated on the first objective lens 6, thereby correcting the generated spherical aberration. In this way, a third-order component, as a primary component of the generated spherical aberration, is removed, thereby remarkably reducing the spherical aberration. However, even if the third-order component of the spherical aberration can be removed, a higher-order component, mainly, a fifth-order component cannot be removed in this state.

The generated amount of fifth-order spherical aberration is proportional to the thickness of a light transmissive layer from a surface of the first optical information recording medium 30, corresponding to the optimal substrate thickness T of the first objective lens 6, to an intended information recording surface; and is increased, as the targeted information recording surface is closer to the information recording surface 301 (having a light transmissive layer thickness $d_1$), or the information recording surface 304 (having a light transmissive layer thickness: $d_1+d_2+d_3+d_4$). The optimal substrate thickness T of the first objective lens 6 is defined in such a manner that a variation of a fifth-order spherical aberration which is generated on the information recording surface 304 of the first optical information recording medium 30 farthest from the first objective lens 6 at the time of correcting a third-order spherical aberration, and a variation of a fifth-order spherical aberration which is generated on the information recording surface 301 of the first optical information recording medium 30 closest to the first objective lens 6 at the time of correcting the third-order spherical aberration are set equal to each other. This enables to suppress a variation of a wavefront aberration (a fifth-order spherical aberration) on the information recording surface 301, 304 at the time of correcting a third-order spherical aberration.

In the specification, the expression "equal to each other" not only includes a state of "complete agreement" but also includes a state of substantially equal to each other. Specifically, it is preferable to set a difference between a variation of a wavefront aberration (e.g. a fifth-order spherical aberration) which is generated on the information recording surface 304 of the first optical information recording medium 30 farthest from the first objective lens 6 at the time of correcting a third-order spherical aberration, and a variation of a wavefront aberration (e.g. a fifth-order spherical aberration) which is generated on the information recording surface 301 of the first optical information recording medium 30 closest to the first objective lens 6 at the time of correcting the third-order spherical aberration, to 10 m$\lambda$ or less, and more preferably to 5 m$\lambda$ or less.

In other words, the optimal substrate thickness T of the first objective lens 6 for use in equally distributing a variation of a fifth-order spherical aberration can be expressed as follows. Assuming that the thickness of a light transmissive layer of a first information recording surface closest to the first objective lens 6 with respect to the laser incident surface of the first optical information recording medium 30 is $d_1$, the refractive index of the light transmissive layer of the first information recording surface is $n_1$, the thickness of the light transmissive layer of each of the information recording surfaces is $d_i$, and the refractive index of the light transmissive layer of each of the information recording surfaces is $n_i$ (where i is an integer, $1 \leq i \leq m$), the optimal substrate thickness (the light transmissive layer thickness of the first optical information recording medium which minimizes a third-order spherical aberration at the time of incidence of parallel light into the first objective lens 6) T of the first objective lens 6 satisfies the following formula (2). Further, when the optimal substrate thickness T of the first objective lens 6 lies at a position away, by $\Delta t$, from an objective lens side surface of a light transmissive layer having a light transmissive layer thickness $d_k$ and a refractive index $n_k$, the optical head device 10 satisfies the following formula (3).

$$\frac{d_1}{n_1} < \frac{T}{N} < \sum_{i=1}^{m} \frac{d_i}{n_i} \qquad (2)$$

where N is an arbitrary refractive index.

$$\left\{ \begin{array}{l} \sum_{i=k+1}^{m} \frac{d_i}{48} \frac{(n_i^2-1)(n_i^2+3)}{n_i^5}(NA)^6 + \\ \frac{(d_k - \Delta t)}{48} \frac{(n_k^2-1)(n_k^2+3)}{n_k^5}(NA)^6 \end{array} \right\} \approx \qquad (3)$$

$$\left\{ \begin{array}{l} \frac{\Delta t}{48} \frac{(n_k^2-1)(n_k^2+3)}{n_k^5}(NA)^6 + \\ \sum_{i=1}^{k-1} \frac{d_i}{48} \frac{(n_i^2-1)(n_i^2+3)}{n_i^5}(NA)^6 \end{array} \right\}$$

In the case where a difference between a variation of a fifth-order spherical aberration which is generated on an information recording surface of the first optical information recording medium 30 farthest from the first objective lens 6 at the time of correcting a third-order spherical aberration, and a variation of a fifth-order spherical aberration which is generated on an information recording surface of the first optical information recording medium 30 closest to the first objective lens 6 at the time of correcting the third-order spherical aberration is larger than 10 m$\lambda$, an optimal position for use in learning for recording, or reproducing may be displaced, and it is necessary to re-learn the optimal position.

However, in this embodiment, the optimal substrate thickness of the first objective lens 6 is defined in such a manner that a difference between a variation of a fifth-order spherical aberration which is generated on an information recording surface of the first optical information recording medium 30 farthest from the first objective lens 6 at the time of correcting a third-order spherical aberration, and a variation of a fifth-order spherical aberration which is generated on an information recording surface of the first optical information recording medium 30 closest to the first objective lens 6 at the time of correcting the third-order spherical aberration is set to 10 m$\lambda$, or less. This unnecessitates re-learning.

Alternatively, the optimal substrate thickness of the first objective lens 6 may be defined in such a manner that a difference between the variation of the fifth-order spherical aberration which is generated at the time of correcting the third-order spherical aberration on the information recording surface of the first optical information recording medium 30 farthest from the first objective lens 6, and the variation of the fifth-order spherical aberration which is generated on the information recording surface of the first optical information recording medium 30 closest to the first objective lens 6 at the time of correcting the third-order spherical aberration is set to 5 m$\lambda$ or less.

In the following, concrete numerical value examples of the optical head device 10 in the first embodiment are described.

wavelength of semiconductor laser 1: $\lambda$=405 nm
NA of first objective lens 6: NA=0.85
focal length of first objective lens 6: fol=1.3 mm
focal length of collimator lens 4: fcl=15.0 mm thickness of each light transmissive layer between information recording surfaces:

$d_1 = 45$ μm $d_2 = 18$ μm $d_3 = 13$ μm $d_4 = 24$ μm refractive index of each light transmissive layer between information recording surfaces:

$n_1 = 1.52$ $n_2 = 1.52$ $n_3 = 1.52$ $n_4 = 1.52$

Actually, calculating Δt and T by applying the above numerical value examples to the formulas (2) and (3) yields a result: T=72.5 μm (design refractive index N=1.52).

Figure 3:
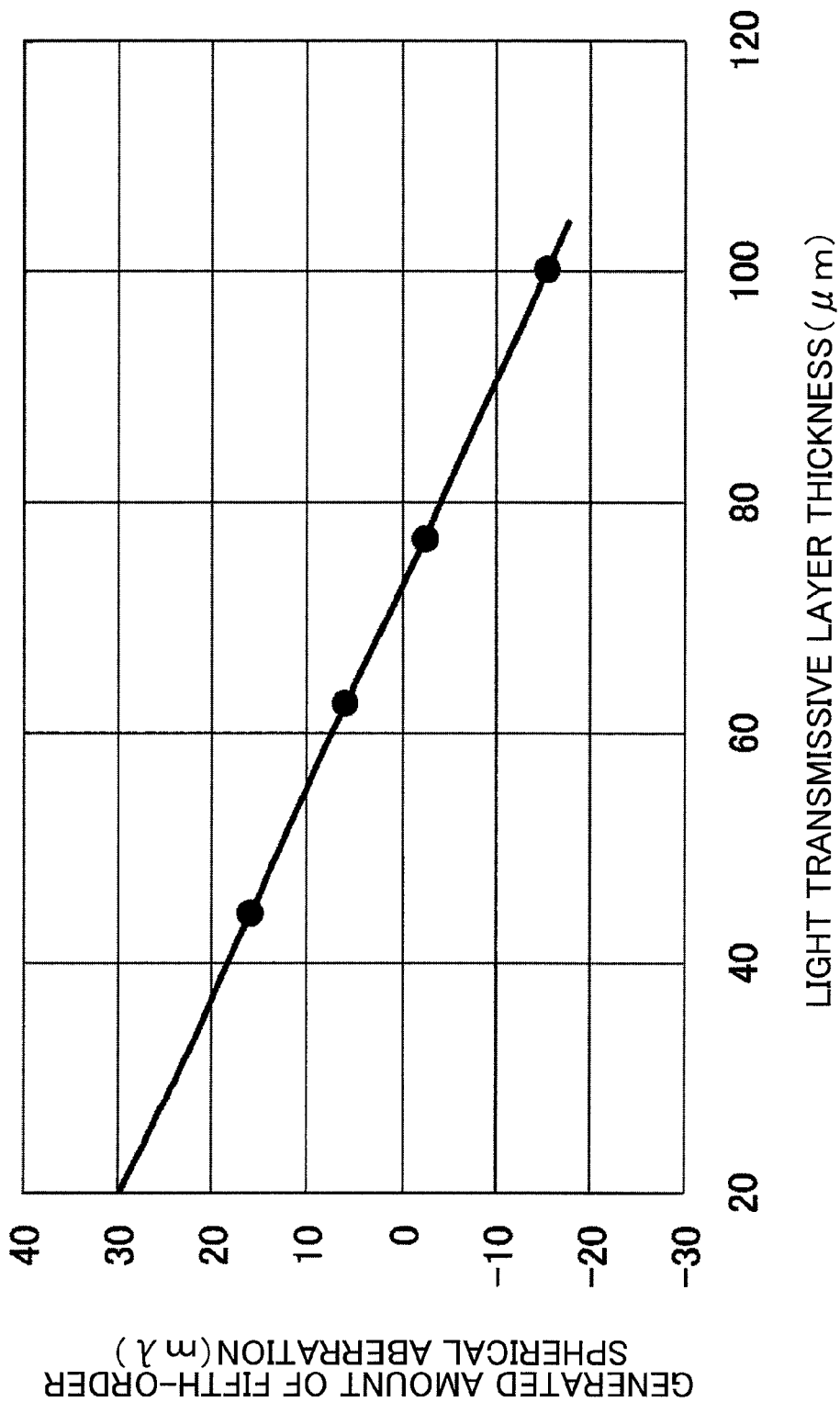
FIG. 3 is a diagram showing a relation between the generated amount of fifth-order spherical aberration and the light transmissive layer thickness at the time of correcting a third-order spherical aberration of the optical head device in the first embodiment of the invention.

FIG. 3 is a diagram showing a relation between the generated amount of fifth-order spherical aberration, and the light transmissive layer thickness, in the case where the first objective lens 6 has the optimal substrate thickness (the light transmissive layer thickness of the first optical information recording medium 30 which minimizes a third-order spherical aberration at the time of parallel light incidence) T=72.5 μm (design refractive index N=1.52). As shown in FIG. 3, a variation of a fifth-order spherical aberration can be equally distributed between the light transmissive layer thickness $(d_1+d_2+d_3+d_4)$ of the information recording surface 304 farthest from the first objective lens 6, and the light transmissive layer thickness $(d_1)$ of the information recording surface 301 closest from the first objective lens 6. This enables to suppress the variation of the fifth-order spherical aberration to ±20 λm or less, thereby realizing satisfactory recording and/or reproducing.

In this embodiment, described is a case that the optimal substrate thickness T of the first objective lens 6 is so defined as to equally distribute a variation of a fifth-order spherical aberration. As far as the optimal substrate thickness T of the first objective lens 6 is so defined as to satisfy the relations expressed by the formulas (2) and (4), an influence of the generated amount of fifth-order spherical aberration is practically negligible.

Specifically, assuming that the thickness of a light transmissive layer from the laser light incident surface of the first information recording medium to the first information recording surface closest to the first objective lens is $d_1$, the refractive index of the light transmissive layer of the first information recording surface is $n_1$, the thickness of the light transmissive layer of each of the information recording surfaces is $d_i$, and the refractive index of the light transmissive layer of each of the information recording surfaces is $n_i$ (where i is an integer, $1 \leq i \leq m$) the optimal substrate thickness (the light transmissive layer thickness of the first optical information recording medium which minimizes a third-order spherical aberration at the time of incidence of parallel light into the objective lens 6) T of the first objective lens 6 satisfies the following formula (2). Further, when the optimal substrate thickness T of the first objective lens 6 lies at a position away, by Δt, from an objective lens side surface of a light transmissive layer having a light transmissive layer thickness $d_k$ and a refractive index $n_k$, the optical head device 10 satisfies the following formula (4).

$$\left\{ \sum_{i=k+1}^{m} \frac{d_i}{48} \frac{(n_i^2-1)(n_i^2+3)}{n_i^5}(NA)^6 + \frac{(d_k - \Delta t)}{48} \frac{(n_k^2-1)(n_k^2+3)}{n_k^5}(NA)^6 \right\} - \left\{ \frac{\Delta t}{48} \frac{(n_k^2-1)(n_k^2+3)}{n_k^5}(NA)^6 + \sum_{i=1}^{k-1} \frac{d_i}{48} \frac{(n_i^2-1)(n_i^2+3)}{n_i^5}(NA)^6 \right\} \leq 10 \quad (4)$$

In this embodiment, the optical information recording medium has four information recording surfaces. The invention is not specifically limited to the above. A multilayer structure of two information recording surfaces, or three information recording surfaces, or five or more information recording surfaces also enables to obtain substantially the same effect as described above. In the case where the optical information recording medium has two information recording surfaces, substantially the same effect as described above can be obtained, even if the light transmissive layer thickness of an information recording surface of the first optical information recording medium farthest from the first objective lens is 95 λm or more, and the light transmissive layer thickness of an information recording surface of the first optical information recording medium closest to the first objective lens is 80 λm or less. In the case where the optical information recording medium has three information recording surfaces, substantially the same effect as described above can be obtained, even if the light transmissive layer thickness of an information recording surface of the first optical information recording medium farthest from the first objective lens is 95 λm or more, and the light transmissive layer thickness of an information recording surface of the first optical information recording medium closest to the first objective lens is 75 λm or less.

In this embodiment, a single collimator lens is used. As far as a light beam to be incident into the objective lens 6 can be turned into divergent light or convergent light, substantially the same effect as described above can be obtained, even with use of a lens system constituted of two lens groups.

Second Embodiment

Figure 4:
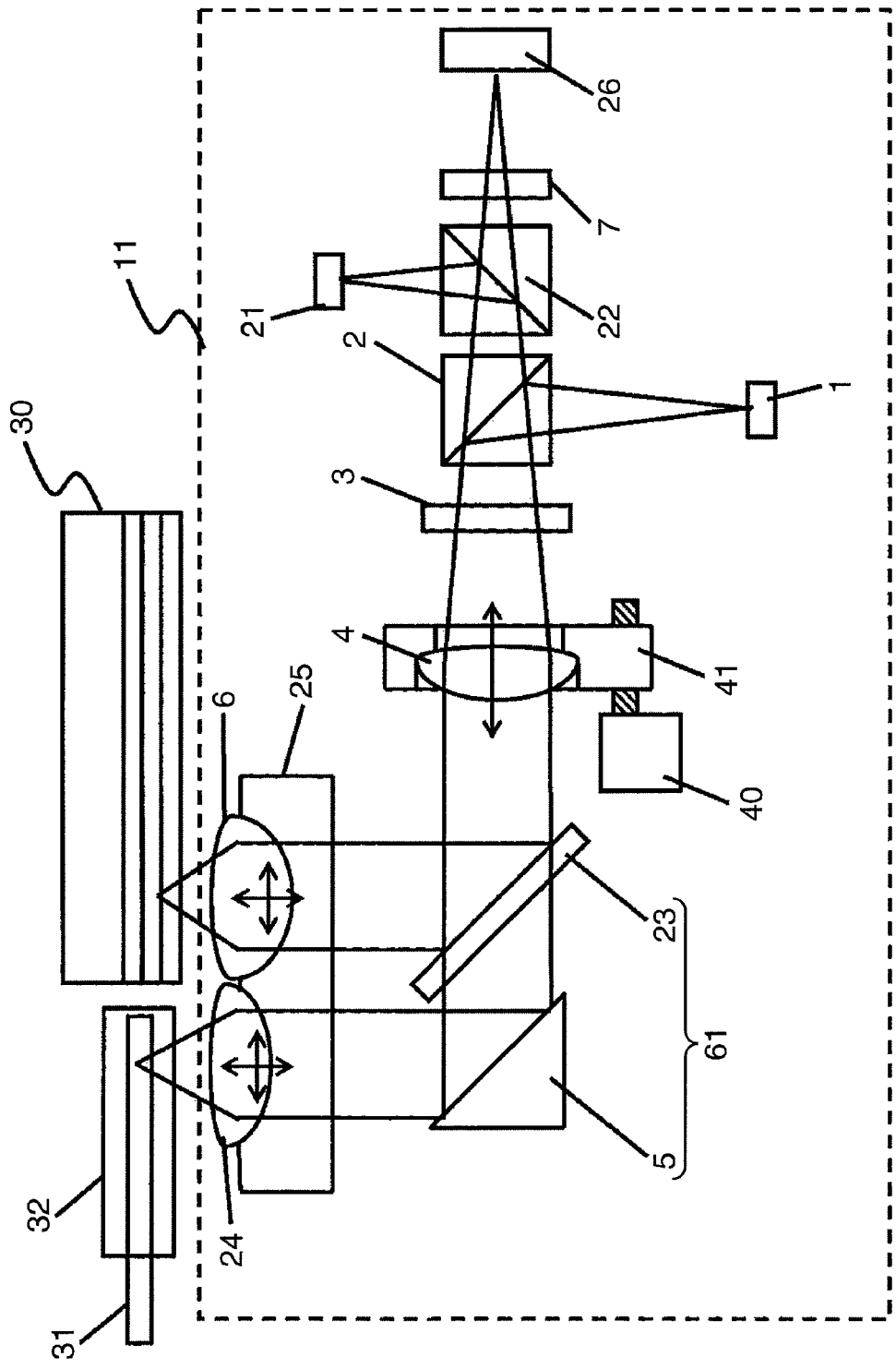
FIG. 4 is a schematic construction diagram of an optical head device in a second embodiment of the invention.

In this section, an optical head device in the second embodiment of the invention is described referring to FIG. 4. FIG. 4 is a schematic construction diagram of the optical head device in the second embodiment of the invention.

Elements of the optical head device in the second embodiment substantially identical or equivalent to those in the first embodiment are indicated with the same reference numerals, and description thereof is omitted herein. Referring to FIG. 4, the optical head device 11 includes a semiconductor laser 1, a beam splitter 2, a quarter wavelength plate 3, a collimator lens 4, a first objective lens 6, a detection lens 7, a stepping motor 40, a lens holder 41, a two-wavelength semiconductor laser 21, a beam splitter 22, a second objective lens 24, a two-axis actuator 25, a three-wavelength photodetector 26, and a light flux separating section 61.

The semiconductor laser 1 emits a first light beam (laser light) having a first wavelength of 405 nm. The two-wavelength semiconductor laser 21 emits a second light beam having a second wavelength of 660 nm longer than the first wavelength, and a third light beam having a third wavelength of 780 nm longer than the second wavelength. The semiconductor laser 1 corresponds to an example of a first light source, and the two-wavelength semiconductor laser 21 corresponds to an example of a second light source and a third light source.

The light flux separating section 61 has a reflection mirror 5 and a wavelength selecting element 23. The wavelength selecting element 23 reflects the first light beam having the first wavelength and emitted from the semiconductor laser 1, and transmits the second light beam having the second wavelength, and the third light beam having the third wavelength, which have been emitted from the two-wavelength semiconductor laser 21. The reflection mirror 5 reflects the second light beam and the third light beam which have been transmitted through the wavelength selecting element 23.

The first objective lens 6 has an NA (a first numerical aperture) of 0.85 corresponding to a BD. The second objective lens 24 has an NA (a second numerical aperture) of 0.65 corresponding to a DVD and a CD. The two-axis actuator 25 is mounted with the first objective lens 6 and the second objective lens 24 to drive the first objective lens 6 and the second objective lens 24 in two axis directions. The three-wavelength photodetector 26 detects the first light beam reflected on a first optical information recording medium 30, the second light beam reflected on a second optical information recording medium 31, and the third light beam reflected on a third optical information recording medium 32. The first optical information recording medium 30 is a BD, the second optical information recording medium 31 is a DVD, and the third optical information recording medium 32 is a CD.

In the following, an operation of the optical head device 11, in the case where information recording and/or reproducing is performed on or from the first optical information recording medium 30, is described. Description of an operation of the optical head device 11 in the second embodiment, which is substantially identical or equivalent to the operation of the optical head device 10 in the first embodiment, is omitted herein. The second embodiment is different from the first embodiment in that the first light beam having the first wavelength of 405 nm and emitted from the first light source (semiconductor laser 1) is reflected on the wavelength selecting element 23, in place of the reflection mirror 5, and is guided to the first objective lens 6.

Specifically, the first light beam as linearly polarized light emitted from the semiconductor laser 1 is reflected on the beam splitter 2, converted into circularly polarized light by the quarter wavelength plate 3, and converted into parallel light by the collimator lens 4. The first light beam converted into parallel light is reflected on the wavelength selecting element 23, and incident into the first objective lens 6. The first light beam incident into the first objective lens 6 is collected as a light spot on either one of information recording surfaces 301 through 304 of the first optical information recording medium 30 through a transparent substrate.

Next, an operation of the optical head device 11, in the case where information recording and/or reproducing is performed on or from the second optical information recording medium 31, is described. The two-wavelength semiconductor laser 21 emits the second light beam having the second wavelength of 660 nm. The second light beam as linearly polarized light emitted from the two-wavelength semiconductor laser 21 is reflected on the beam splitter 22, transmitted through the beam splitter 2, and converted into circularly polarized light by the quarter wavelength plate 3. Thereafter, the second light beam converted into circularly polarized light is converted into parallel light by the collimator lens 4, transmitted through the wavelength selecting element 23, reflected on the reflection mirror 5, and incident into the second objective lens 24. The second light beam converted into the second objective lens 24 is collected as a light spot on the second optical information recording medium 31 through the transparent substrate.

The second light beam reflected on the second optical information recording medium 31 is then transmitted through the second objective lens 24, reflected on the reflection mirror 5, transmitted through the wavelength selecting element 23 and the collimator lens 4, and converted into linearly polarized light along an optical path different from an incoming path by the quarter wavelength plate 3. Thereafter, the second light beam converted into linearly polarized light is transmitted through the beam splitter 2 and the beam splitter 22, and guided to the three-wavelength photodetector 26 through the detection lens 7.

The second light beam detected by the three-wavelength photodetector 26 is subjected to photoelectric conversion and computation, thereby generating a focus error signal for use in following a plane displacement of the second optical information recording medium 31, and a tracking error signal for use in following decentering of the second optical information recording medium 31. The two-axis actuator 25 drives the second objective lens 24 in two axis directions so that a light spot follows an information track of the rotating second optical information recording medium 31, based on the focus error signal and the tracking error signal.

Next, an operation of the optical head device 11, in the case where information recording and/or reproducing is performed on or from the third optical information recording medium 32, is described. The two-wavelength semiconductor laser 21 emits the third light beam having the third wavelength of 780 nm. The third light beam as linearly polarized light emitted from the two-wavelength semiconductor laser 21 is reflected on the beam splitter 22, transmitted through the beam splitter 2, and converted into circularly polarized light by the quarter wavelength plate 3. Thereafter, the third light beam converted into circularly polarized light is converted into parallel light by the collimator lens 4, transmitted through the wavelength selecting element 23, reflected on the reflection mirror 5, and incident into the second objective lens 24. The third light beam incident into the second objective lens 24 is collected as a light spot on the third optical information recording medium 32 through the transparent substrate.

The third light beam reflected on the third optical information recording medium 32 is then transmitted through the second objective lens 24, reflected on the reflection mirror 5, transmitted through the wavelength selecting element 23 and the collimator lens 4, and converted into linearly polarized light along an optical path different from an incoming path by the quarter wavelength plate 3. Thereafter, the third light beam converted into linearly polarized light is transmitted through the beam splitter 2 and the beam splitter 22, and guided to the three-wavelength photodetector 26 through the detection lens 7.

The third light beam detected by the three-wavelength photodetector 26 is subjected to photoelectric conversion and computation, thereby generating a focus error signal for use in following a plane displacement of the third optical information recording medium 32, and a tracking error signal for use in following decentering of the third optical information recording medium 32. The two-axis actuator 25 drives the second objective lens 24 in two axis directions so that a light spot follows an information track of the rotating third optical information recording medium 32, based on the focus error signal and the tracking error signal.

As described above, similarly to the first embodiment, the optical head device 11 in the second embodiment defines the optimal substrate thickness T of the first objective lens 6, using the formulas (2) and (3), with respect to the first optical information recording medium 30 having two or more information recording surfaces. This enables to equally distribute a variation of a fifth-order spherical aberration which is generated at the time of correcting a third-order spherical aberration between the light transmissive layer thickness ($d_1+d_2+d_3+d_4$) of the information recording surface 304 farthest from the first objective lens 6, and the light transmissive layer thickness ($d_1$) of the information recording surface 301 closest from the first objective lens 6. This enables to minimize an influence of a variation of a fifth-order spherical aberration.

The optical head device 11 in the second embodiment is compatible with optical information recording media having three different kinds of specifications.

In this embodiment, described is a case that the optimal substrate thickness T of the first objective lens 6 is so defined as to equally distribute a variation of a fifth-order spherical aberration. Alternatively, as far as the variation of the fifth-order spherical aberration satisfies the relations expressed by the formulas (2) and (4), an influence of the variation of the fifth-order spherical aberration is practically negligible.

In this embodiment, a single collimator lens is used. As far as a light beam to be incident into the objective lens 6 can be turned into divergent light or convergent light, substantially the same effect as described above can be obtained, even with use of a lens system constituted of two lens groups.

Third Embodiment

Figure 5:
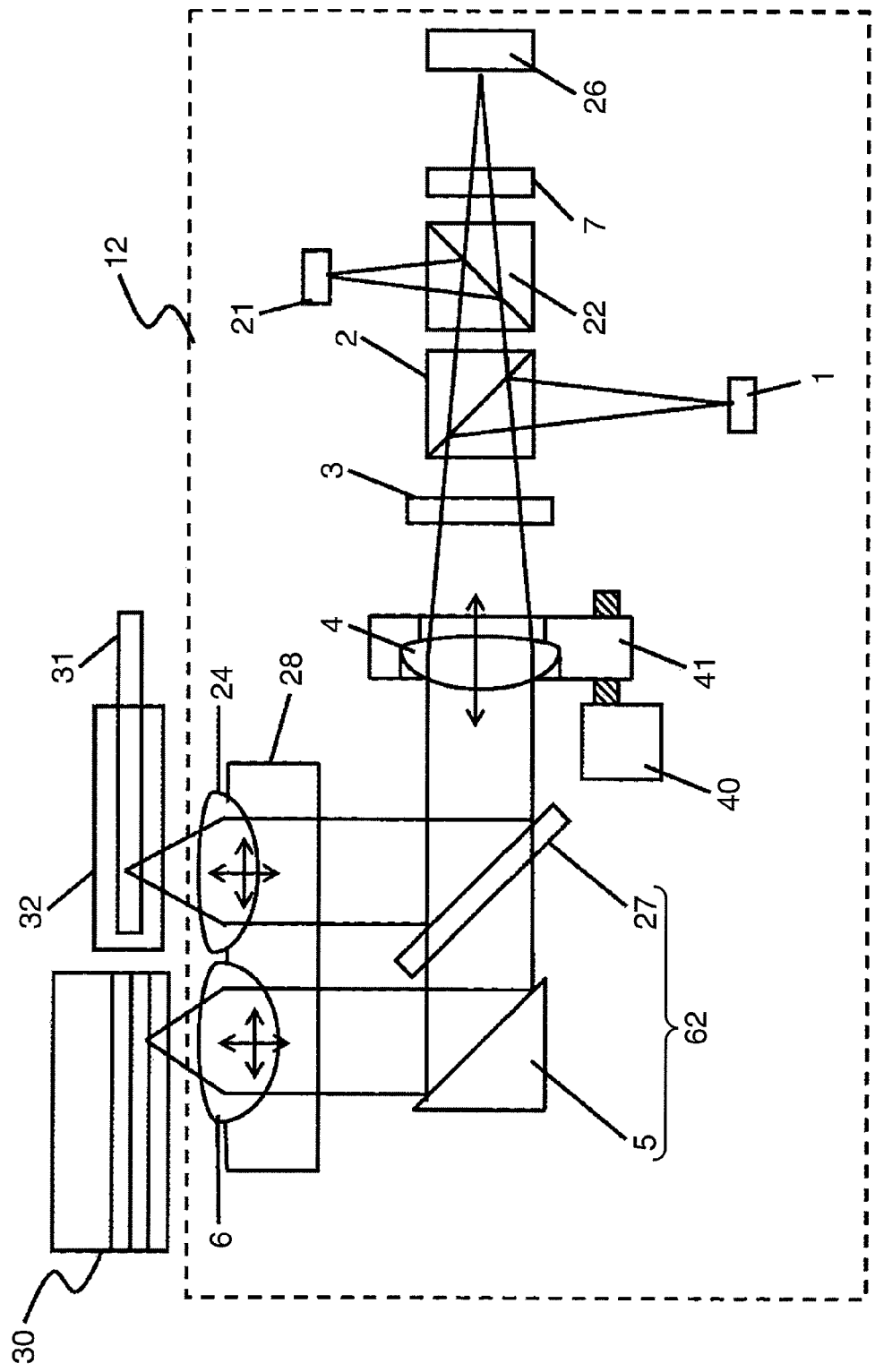
FIG. 5 is a schematic construction diagram of an optical head device in a third embodiment of the invention.

In this section, an optical head device in the third embodiment of the invention is described referring to FIG. 5. FIG. 5 is a schematic construction diagram of the optical head device in the third embodiment of the invention.

Elements of the optical head device in the third embodiment which are substantially identical or equivalent to those in the second embodiment are indicated with the same reference numerals, and description thereof is omitted herein. Referring to FIG. 5, the optical head device 12 includes a semiconductor laser 1, a beam splitter 2, a quarter wavelength plate 3, a collimator lens 4, a first objective lens 6, a detection lens 7, a stepping motor 40, a lens holder 41, a two-wavelength semiconductor laser 21, a beam splitter 22, a second objective lens 24, a three-wavelength photodetector 26, a two-axis actuator 28, and a light flux separating section 62.

The light flux separating section 62 has a reflection mirror 5 and a wavelength selecting element 27. The wavelength selecting element 27 is constituted of a parallel flat plate having wavelength selectivity. The wavelength selecting element 27 transmits a first light beam having a first wavelength and emitted from the semiconductor laser 1, and reflects a second light beam having a second wavelength, and a third light beam having a third wavelength, which have been emitted from the two-wavelength semiconductor laser 21. The reflection mirror 5 reflects the first light beam transmitted through the wavelength selecting element 27.

The first objective lens 6 and the second objective lens 24 are disposed in the order of the second objective lens 24 and the first objective lens 6 from the incident side of the first light beam, the second light beam, and the third light beam, along a direction tangential to a first optical information recording medium 30, a second optical information recording medium 31, and a third optical information recording medium 32.

The two-axis actuator 28 is mounted with the second objective lens 24 and the first objective lens 6 to drive the second objective lens 24 and the first objective lens 6 in two axis directions. The first optical information recording medium 30 in the third embodiment has two or more information recording surfaces.

An operation of the optical head device 12, in the case where information recording and/or reproducing is performed on or from the first optical information recording medium 30, is described. Description on the operation of the optical head device 12 in the third embodiment, which is substantially identical or equivalent to the operation of the optical head device 11 in the second embodiment, is omitted herein. The third embodiment is different from the second embodiment in that after the first light beam having the first wavelength of 405 nm and emitted from a first light source (semiconductor laser 1) is transmitted through the wavelength selecting element 27, the first light beam is reflected on the reflection mirror 5, and guided to the first objective lens 6.

Specifically, the first light beam as linearly polarized light emitted from the semiconductor laser 1 is reflected on the beam splitter 2, converted into circularly polarized light by the quarter wavelength plate 3, and converted into parallel light by the collimator lens 4. The first light beam converted into parallel light is transmitted through the wavelength selecting element 27, reflected on the reflection mirror 5, and incident into the first objective lens 6. The first light beam incident into the first objective lens 6 is collected as a light spot on either one of information recording surfaces 301 through 304 of the first optical information recording medium 30 through a transparent substrate.

Next, an operation of the optical head device 12, in the case where information recording and/or reproducing is performed on or from the second optical information recording medium 31, is described. Description on the operation of the optical head device 12 in the third embodiment, which is substantially identical or equivalent to the operation of the optical head device 11 in the second embodiment, is omitted herein. The third embodiment is different from the second embodiment in that the second light beam having the second wavelength of 660 nm and emitted from a second light source (two-wavelength semiconductor laser 21) is reflected on the wavelength selecting element 27, and collected as a light spot on the second optical information recording medium 31 through the transparent substrate by the second objective lens 24.

Specifically, the second light beam as linearly polarized light emitted from the two-wavelength semiconductor laser 21 is reflected on the beam splitter 22, transmitted through the beam splitter 2, and converted into circularly polarized light by the quarter wavelength plate 3. Thereafter, the second light beam converted into circularly polarized light is converted into parallel light by the collimator lens 4, reflected on the wavelength selecting element 27, and incident into the second objective lens 24. The second light beam incident into the second objective lens 24 is collected as a light spot on the second optical information recording medium 31 through the transparent substrate.

The second light beam reflected on the second optical information recording medium 31 is then transmitted through the second objective lens 24, reflected on the wavelength selecting element 27, and guided to the three-wavelength photodetector 26. The second light beam detected by the three-wavelength photodetector 26 is subjected to photoelectric conversion and computation, thereby generating a focus error signal for use in following a plane displacement of the second optical information recording medium 31, and a tracking error signal for use in following decentering of the second optical information recording medium 31. The two-axis actuator 28 drives the second objective lens 24 in two axis directions so that a light spot follows an information track of the rotating second optical information recording medium 31, based on the focus error signal and the tracking error signal.

Next, an operation of the optical head device 12, in the case where information recording and/or reproducing is performed on or from the third optical information recording medium 32, is described. Description on the operation of the optical head device 12 in the third embodiment, which is substantially identical or equivalent to the operation of the optical head device 11 in the second embodiment, is omitted herein. The third embodiment is different from the second embodiment in that the third light beam having the third wavelength of 780 nm and emitted from a third light source (two-wavelength semiconductor laser 21) is reflected on the wavelength selecting element 27, and collected as a light spot on the second optical information recording medium 31 through the transparent substrate by the second objective lens 24.

Specifically, the third light beam converted into linearly polarized light emitted from the two-wavelength semiconductor laser 21 is reflected on the beam splitter 22, transmitted through the beam splitter 2, and converted into circularly polarized light by the quarter wavelength plate 3. Thereafter, the third light beam converted into circularly polarized light is converted into parallel light by the collimator lens 4, reflected on the wavelength selecting element 27, and incident into the second objective lens 24. The third light beam incident into the second objective lens 24 is collected as a light spot on the third optical information recording medium 32 through the transparent substrate.

The third light beam reflected on the third optical information recording medium 32 is then transmitted through the second objective lens 24, reflected on the wavelength selecting element 27, and guided to the three-wavelength photodetector 26. The third light beam detected by the three-wavelength photodetector 26 is subjected to photoelectric conversion and computation, thereby generating a focus error signal for use in following a plane displacement of the third optical information recording medium 32, and a tracking error signal for use in following decentering of the third optical information recording medium 32. The two-axis actuator 28 drives the second objective lens 24 in two axis directions so that a light spot follows an information track of the rotating third optical information recording medium 32, based on the focus error signal and the tracking error signal.

The third embodiment is different from the second embodiment in that a third-order astigmatism is generated, when laser light converted into divergent light or convergent light by the collimator lens 4 is transmitted through the wavelength selecting element 27 disposed at an inclination of about 45° to correct a third-order spherical aberration resulting from a change in the light transmissive layer thickness of the first optical information recording medium 30. Specifically, the generated amount of third-order astigmatism is proportional to the light transmissive layer thickness from a surface of the first optical information recording medium 30, corresponding to the optimal substrate thickness T of the first objective lens 6, to an intended information recording surface; and is increased, as the targeted information recording surface is closer to the information recording surface 301 (having a light transmissive layer thickness: $d_1$), or the information recording surface 304 (having a light transmissive layer thickness: $d_1+d_2+d_3+d_4$). Accordingly, an influence of aberration on the information recording surface 301, 304 can be suppressed by setting the generated amount of third-order astigmatism to such a value as to equally distribute a variation of the third-order astigmatism.

Specifically, the optimal substrate thickness of the first objective lens 6 is defined in such a manner that a variation of a third-order astigmatism which is generated on an information recording surface of the first optical information recording medium 30 farthest from the first objective lens 6 at the time of correcting a third-order spherical aberration, and a variation of a third-order astigmatism which is generated on an information recording surface of the first optical information recording medium 30 closest to the first objective lens 6 at the time of correcting the third-order spherical aberration are set equal to each other.

It is preferable to set a difference between the variation of the third-order astigmatism which is generated on the information recording surface 304 of the first optical information recording medium 30 farthest from the first objective lens 6 at the time of correcting the third-order spherical aberration, and the variation of the third-order astigmatism which is generated on the information recording surface 301 of the first optical information recording medium 30 closest to the first objective lens 6 at the time of correcting the third-order spherical aberration, to 10 mλ or less, and more preferably to 5 mλ or less.

In this embodiment, the generated amount of third-order astigmatism is proportional to a square of an NA of laser light to be incident into the wavelength selecting element 27. Assuming that the NA of laser light to be incident into the wavelength selecting element 27 at the time of correcting a spherical aberration on an information recording surface of the first optical information recording medium 30 farthest from the first objective lens 6 and having a predetermined light transmissive layer thickness is $NA_h$, and the NA of laser light to be incident into the wavelength selecting element 27 at the time of correcting a spherical aberration on an information recording surface of the first optical information recording medium 30 closest to the first objective lens 6 and having a predetermined light transmissive layer thickness is $NA_s$, the optimal substrate thickness T of the first objective lens is so defined as to satisfy the following formula (5). This enables to suppress a variation of a wavefront aberration (a third-order astigmatism) on the information recording surface 301, 304.

$$(NA_h)^2 \approx (NA_s)^2 \tag{5}$$

In the following, concrete numerical value examples of the optical head device 12 in the third embodiment are described.

wavelength of semiconductor laser 1: λ=405 nm
NA of first objective lens 6: NA=0.85
focal length of first objective lens 6: fol=1.3 mm
focal length of collimator lens 4: fcl=15.0 mm
thickness of each light transmissive layer between information recording surfaces:
$d_1$=45 μm
$d_2$=18 μm
$d_3$=13 μm
$d_4$=24 μm
refractive index of each light transmissive layer between information recording surfaces:
$n_1$=1.52
$n_2$=1.52
$n_3$=1.52
$n_4$=1.52
Actually, performing optical simulation using the above numerical value examples yields a result: $NA_h$=0.00966 and $NA_s$=0.00973, in the case where the first objective lens 6 has the optimal substrate thickness (the light transmissive layer thickness of the first optical information recording medium 30 which minimizes a residual aberration) T=72.5 μm. This result satisfies the relation expressed by the formula (5).

Figure 6:
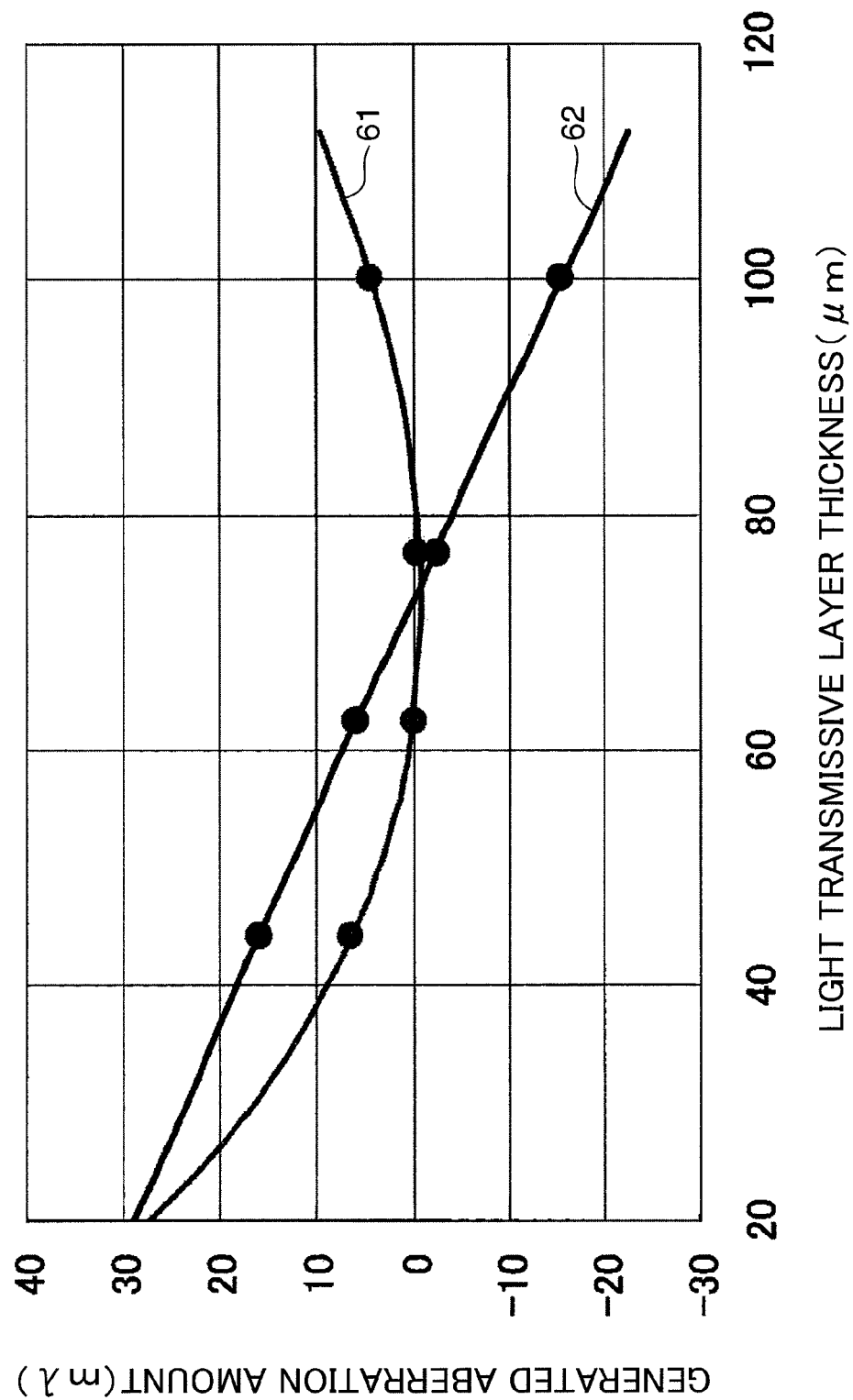
FIG. 6 is a diagram showing a relation between the generated amount of third-order astigmatism and the light transmissive layer thickness, and a relation between the generated amount of fifth-order spherical aberration and the light transmissive layer thickness at the time of correcting a third-order spherical aberration of the optical head device in the third embodiment of the invention.

FIG. 6 is a diagram showing a relation between the generated amount of third-order astigmatism and the light transmissive layer thickness, and a relation between the generated amount of fifth-order spherical aberration and the light transmissive layer thickness, in the case where the first objective lens 6 has the optimal substrate thickness (the light transmissive layer thickness of the first optical information recording medium 30 which minimizes a third-order spherical aberration at the time of parallel light incidence) T=72.5 μm (design refractive index N=1.52). Referring to FIG. 6, a graph 61 shows a relation between the generated amount of third-order astigmatism and the light transmissive layer thickness, and a graph 62 shows a relation between the generated amount of fifth-order spherical aberration and the light transmissive layer thickness.

As shown in FIG. 6, a variation of a third-order astigmatism can be equally distributed, and the generated amount of third-order astigmatism on each information recording surface can be suppressed to ±10 mλ or less, thereby realizing satisfactory recording and/or reproducing. As far as the optimal substrate thickness T of the first objective lens 6 lies in the range of ±10%, an influence of a variation of a third-order astigmatism is practically negligible.

Concerning a fifth-order spherical aberration which is concurrently generated, deriving the optimal substrate thickness T of the first objective lens 6 by applying the numerical value examples to the aforementioned formulas (2) and (3) yields a result that the optimal substrate thickness T of the first objective lens 6 is 72.5 μm. Thus, an influence of a variation of a fifth-order spherical aberration can be equally distributed between the light transmissive layer thickness $(d_1+d_2+d_3+d_4)$ of the information recording surface 304 farthest from the first objective lens 6, and the light transmissive layer thickness $(d_1)$ of the information recording surface 301 closest from the first objective lens 6. This enables to realize satisfactory information recording and/or reproducing.

In this embodiment, described is a case that the optimal substrate thickness T of the first objective lens 6 is so defined as to equally distribute a variation of a fifth-order spherical aberration. As far as the optimal substrate thickness T of the first objective lens 6 is so defined as to satisfy the relations expressed by the formulas (2) and (4), an influence of a variation of a fifth-order spherical aberration is practically negligible.

As described above, in the optical head device 12 of the third embodiment, the optimal substrate thickness T of the first objective lens 6 is so defined as to satisfy the relation expressed by the formula (5) with respect to the first optical information recording medium 30 having two or more information recording surfaces. This enables to equally distribute an influence of a variation of a third-order astigmatism, which is generated when light is transmitted through the wavelength selecting element 27 disposed at an inclination of about 45° at the time of correcting a third-order spherical aberration, thereby minimizing an influence of the third-order astigmatism.

As described above, the conventional art has a drawback that a third-order astigmatism is generated when laser light is transmitted through the wavelength selecting element 27 disposed at an inclination of about 45°, in addition to an influence of a fifth-order spherical aberration with respect to an optical information recording medium having at least two information recording surfaces, and having a relatively large interval between the information recording surfaces.

In this embodiment, the formulas (2), (3), and (5); or the formulas (2), (4), and (5) can be simultaneously satisfied by: setting the NA of laser light to be incident into the wavelength selecting element 27 to such a value as to satisfy the formula (5) so as to reduce a third-order astigmatism; and setting the optimal substrate thickness T of the first objective lens 6 to such a value as to satisfy the formulas (2) and (3), or the formulas (2) and (4). This enables to simultaneously reduce an influence by a variation of a third-order astigmatism, and an influence by variation of fifth-order spherical aberration, which are generated at the time of correcting a third-order spherical aberration, thereby realizing satisfactory recording/reproducing.

In this embodiment, the optical information recording medium has four information recording surfaces. The invention is not specifically limited to the above. A multilayer structure of two information recording surfaces, or three information recording surfaces, or five or more information recording surfaces also enables to obtain substantially the same effect as described above.

The optical head device 12 in the third embodiment is compatible with optical information recording media having three different kinds of specifications.

In this embodiment, a single collimator lens is used. As far as a light beam to be incident into the objective lens 6 can be turned into divergent light or convergent light, substantially the same effect as described above can be obtained, even with use of a lens system constituted of two lens groups.

Fourth Embodiment

Figure 7:
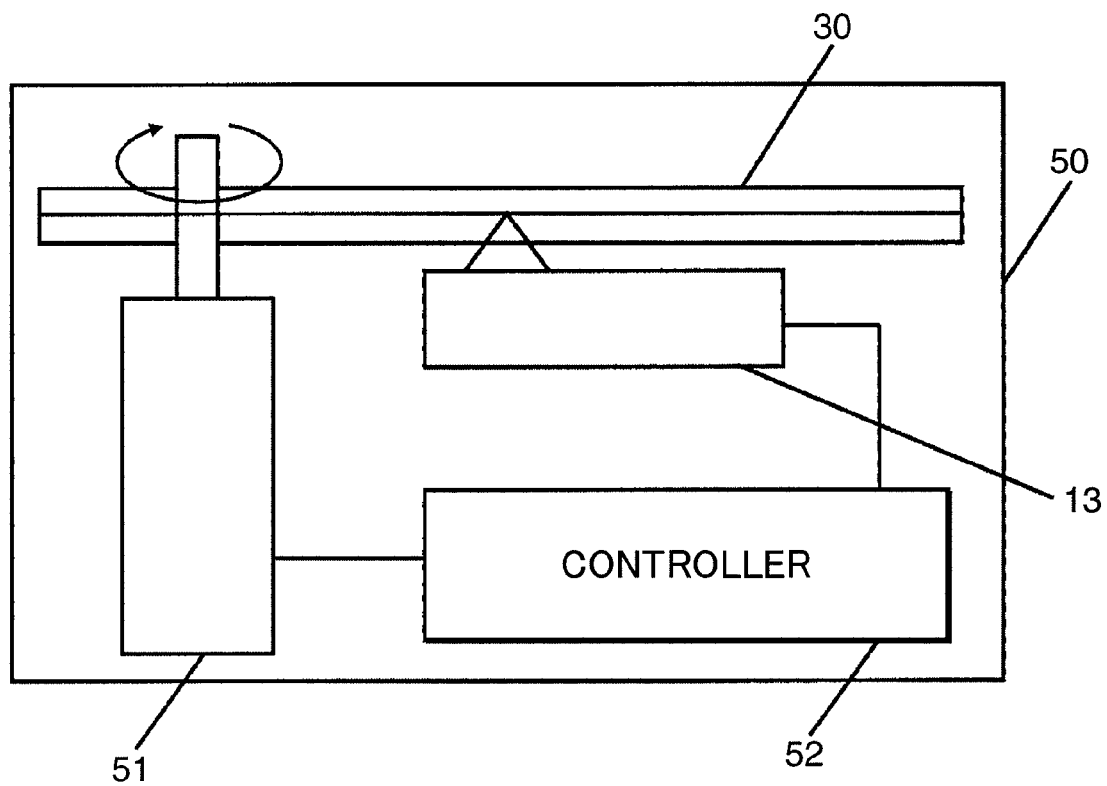
FIG. 7 is a schematic construction diagram of a recording and/or reproducing device in a fourth embodiment of the invention.
Figure 8:
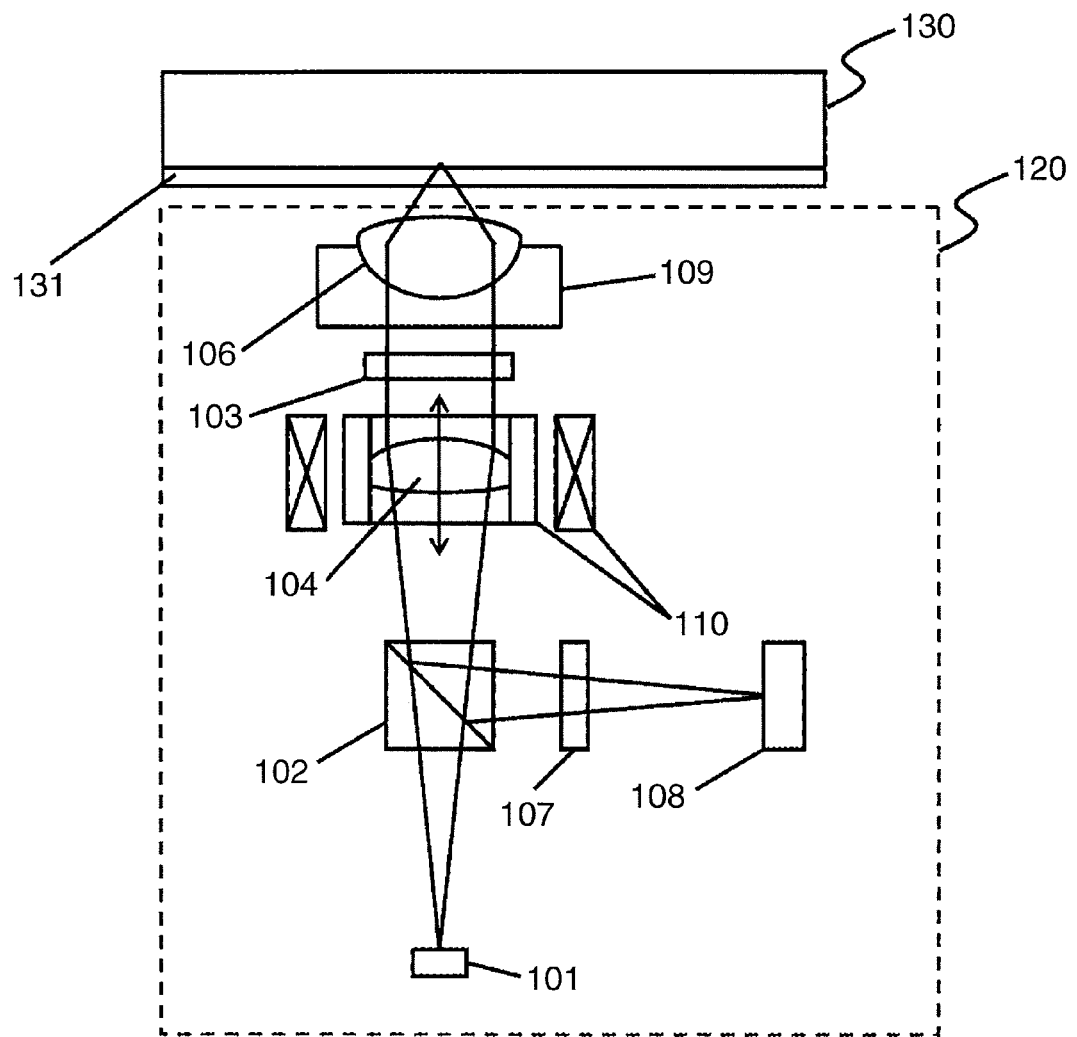
FIG. 8 is a schematic construction diagram of a conventional optical head device.
Figure 9:
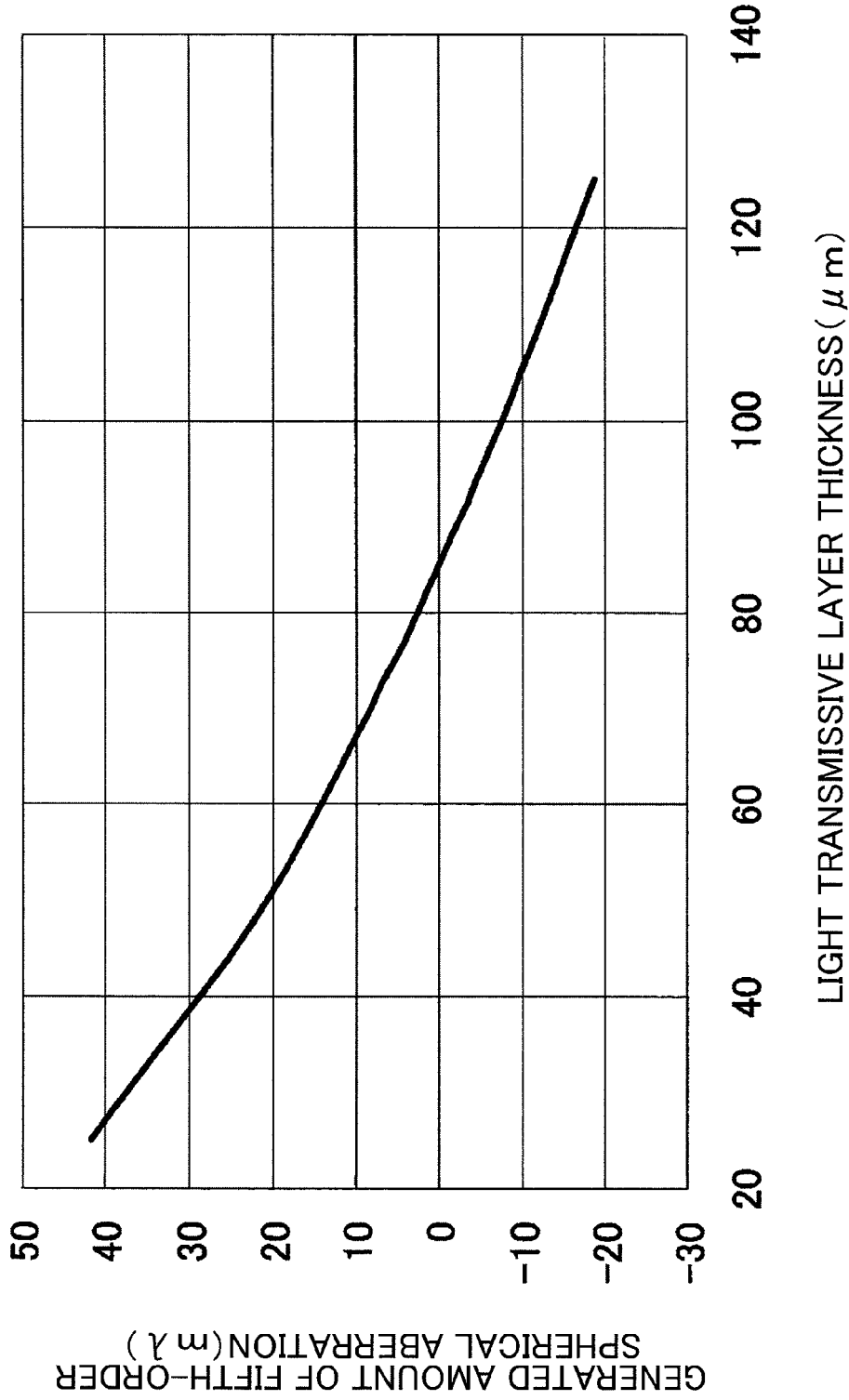
FIG. 9 is a diagram showing a relation between the generated amount of fifth-order spherical aberration and the light transmissive layer thickness at the time of correcting a third-order spherical aberration in the conventional optical head device.

FIG. 7 is a schematic construction diagram of a recording and/or reproducing device in the fourth embodiment of the invention.

Referring to FIG. 7, the recording and/or reproducing device has a casing 50; and an optical information recording medium driver 51, a controller 52, and an optical head device 13 are provided in the casing 50. The optical information recording medium driver 51 rotatably drives a first optical information recording medium 30. The optical head device 13 is any one of the optical head devices 10, 11, and 12 described in the first through the third embodiments. The controller 52 has a function of driving and controlling the optical information recording medium driver 51 and the optical head device 10, a function of performing signal processing with respect to a control signal and an information signal subjected to photoelectric conversion by the optical head device 13, and a function of interfacing an information signal between the exterior and the interior of the casing 50.

Since any one of the optical head devices 10, 11, and 12 described in the first through the third embodiments is mounted as the optical head device 13, the recording and/or reproducing device in this embodiment can minimize influences of a fifth-order spherical aberration and a third-order astigmatism which are newly generated at the time of correcting a third-order spherical aberration resulting from a change in the light transmissive layer thickness of the first optical information recording medium 30. This enables to enhance recording and/or reproducing characteristics of the first optical information recording medium 30.

The recording and/or reproducing device includes a recording and reproducing device for recording information and reproducing information, a recording device dedicatedly used for recording information, and a reproducing device dedicatedly used for reproducing information.

The aforementioned embodiments mainly include the features having the following arrangements.

An optical head device according to an aspect of the invention is an optical head device for use with an optical information recording medium having at least three information recording surfaces to be recorded with an information signal. The optical head device includes: a light source for emitting a light beam; an objective lens for collecting the light beam emitted from the light source on the optical information recording medium; and an aberration corrector disposed between the light source and the objective lens, and for correcting a third-order spherical aberration which is generated depending on a thickness of a light transmissive layer from a surface of the optical information recording medium, corresponding to an optimal substrate thickness of the objective lens, to an intended information recording surface, assuming that the light transmissive layer thickness of the optical information recording medium which minimizes a residual third-order spherical aberration at the time of incidence of parallel light into the objective lens is defined as the optimal substrate thickness of the objective lens. The optimal substrate thickness of the objective lens is defined in such a manner that a variation of a wavefront aberration which is generated on the information recording surface of the optical information recording medium farthest from the objective lens at the time of correcting the third-order spherical aberration, and a variation of a wavefront aberration which is generated on the information recording surface of the optical information recording medium closest to the objective lens at the time of correcting the third-order spherical aberration are set equal to each other.

According to the above arrangement, the optimal substrate thickness of the objective lens is defined in such a manner that a variation of a wavefront aberration which is generated on the information recording surface of the optical information recording medium farthest from the objective lens at the time of correcting the third-order spherical aberration, and a variation of a wavefront aberration which is generated on the information recording surface of the optical information recording medium closest to the objective lens at the time of correcting the third-order spherical aberration are set equal to each other. Accordingly, an influence of a wavefront aberration which is generated at the time of correcting a third-order spherical aberration can be suppressed, and satisfactory information recording and/or reproducing can be performed.

In the optical head device, preferably, the optimal substrate thickness of the objective lens may be defined in such a manner that a difference between the variation of the wavefront aberration which is generated on the information recording surface of the optical information recording medium farthest from the objective lens at the time of correcting the third-order spherical aberration, and the variation of the wavefront aberration which is generated on the information recording surface of the optical information recording medium closest to the objective lens at the time of correcting the third-order spherical aberration is set to 10 m$\lambda$ or less.

According to the above arrangement, the optimal substrate thickness of the objective lens is defined in such a manner that a difference between the variation of the wavefront aberration which is generated on the information recording surface of the optical information recording medium farthest from the objective lens at the time of correcting the third-order spherical aberration, and the variation of the wavefront aberration which is generated on the information recording surface of the optical information recording medium closest to the objective lens at the time of correcting the third-order spherical aberration is set to 10 m$\lambda$ or less. Accordingly, an influence of a wavefront aberration which is generated at the time of correcting a third-order spherical aberration can be minimized, and satisfactory information recording and/or reproducing can be performed.

In the optical head device, preferably, the optimal substrate thickness of the objective lens may be defined in such a manner that a variation of a fifth-order spherical aberration which is generated on the information recording surface of the optical information recording medium farthest from the objective lens at the time of correcting the third-order spherical aberration, and a variation of a fifth-order spherical aberration which is generated on the information recording surface of the optical information recording medium closest to the objective lens at the time of correcting the third-order spherical aberration are set equal to each other.

According to the above arrangement, the optimal substrate thickness of the objective lens is defined in such a manner that a variation of a fifth-order spherical aberration which is generated on the information recording surface of the optical information recording medium farthest from the objective lens at the time of correcting the third-order spherical aberration, and a variation of a fifth-order spherical aberration which is generated on the information recording surface of the optical information recording medium closest to the objective lens at the time of correcting the third-order spherical aberration are set equal to each other. Accordingly, an influence of a fifth-order spherical aberration which is generated at the time of correcting a third-order spherical aberration can be suppressed.

In the optical head device, preferably, the optimal substrate thickness of the objective lens may be defined in such a manner that a difference between the variation of the fifth-order spherical aberration which is generated on the information recording surface of the optical information recording medium farthest from the objective lens at the time of correcting the third-order spherical aberration, and the variation of the fifth-order spherical aberration which is generated on the information recording surface of the optical information recording medium closest to the objective lens at the time of correcting the third-order spherical aberration is set to 10 m$\lambda$ or less.

According to the above arrangement, the optimal substrate thickness of the objective lens is defined in such a manner that a difference between the variation of the fifth-order spherical aberration which is generated on the information recording surface of the optical information recording medium farthest from the objective lens at the time of correcting the third-order spherical aberration, and the variation of the fifth-order spherical aberration which is generated on the information recording surface of the optical information recording medium closest to the objective lens at the time of correcting the third-order spherical aberration is set to 10 m$\lambda$ or less. Accordingly, an influence of a fifth-order spherical aberration which is generated at the time of correcting a third-order spherical aberration can be minimized.

In the optical head device, assuming that the thickness of the light transmissive layer of a first information recording surface of the optical information recording medium closest to the objective lens is $d_1$, the refractive index of the light transmissive layer of the first information recording surface is $n_1$, the thickness of the light transmissive layer of each of the information recording surfaces is $d_i$, the refractive index of the light transmissive layer of each of the information recording surfaces is $n_i$ (where i is an integer, $1 \leq i \leq m$), and the optimal substrate thickness of the objective lens is T, preferably, the optical head device may satisfy the following formula:

$$\frac{d_1}{n_1} < \frac{T}{N} < \sum_{i=1}^{m} \frac{d_i}{n_i}$$

where N is an arbitrary refractive index, and when the optimal substrate thickness T of the objective lens lies at a position away, by $\Delta t$, from an objective lens side surface of a light transmissive layer having a thickness $d_k$ and a refractive index $n_k$, preferably, the optical head device may satisfy the following formula:

$$\left\{ \sum_{i=k+1}^{m} \frac{d_i}{48} \frac{(n_i^2-1)(n_i^2+3)}{n_i^5}(NA)^6 + \frac{(d_k - \Delta t)}{48} \frac{(n_k^2-1)(n_k^2+3)}{n_k^5}(NA)^6 \right\} \approx$$

$$\left\{ \frac{\Delta t}{48} \frac{(n_k^2-1)(n_k^2+3)}{n_k^5}(NA)^6 + \sum_{i=1}^{k-1} \frac{d_i}{48} \frac{(n_i^2-1)(n_i^2+3)}{n_i^5}(NA)^6 \right\}$$

According to the above arrangement, an influence of a fifth-order spherical aberration which is generated at the time of correcting a third-order spherical aberration can be suppressed by defining the optimal substrate thickness T of the objective lens in such a manner as to satisfy the above formulas.

In the optical head device, assuming that the thickness of the light transmissive layer of a first information recording surface of the optical information recording medium closest to the objective lens is $d_1$, the refractive index of the light transmissive layer of the first information recording surface is $n_1$, the thickness of the light transmissive layer of each of the information recording surfaces is $d_i$, the refractive index of the light transmissive layer of each of the information recording surfaces is $n_i$ (where i is an integer, $1 \leq i \leq m$), and the optimal substrate thickness of the objective lens is T, preferably, the optical head device may satisfy the following formula:

$$\frac{d_1}{n_1} < \frac{T}{N} < \sum_{i=1}^{m} \frac{d_i}{n_i}$$

where N is an arbitrary refractive index, and when the optimal substrate thickness T of the objective lens lies at a position away, by $\Delta t$, from an objective lens side surface of a light transmissive layer having a thickness $d_k$ and a refractive index $n_k$, preferably, the optical head device may satisfy the following formula:

$$\left\{ \sum_{i=k+1}^{m} \frac{d_i}{48} \frac{(n_i^2-1)(n_i^2+3)}{n_i^5}(NA)^6 + \frac{(d_k - \Delta t)}{48} \frac{(n_k^2-1)(n_k^2+3)}{n_k^5}(NA)^6 \right\} -$$

$$\left\{ \frac{\Delta t}{48} \frac{(n_k^2-1)(n_k^2+3)}{n_k^5}(NA)^6 + \sum_{i=1}^{k-1} \frac{d_i}{48} \frac{(n_i^2-1)(n_i^2+3)}{n_i^5}(NA)^6 \right\} \leq 10$$

According to the above arrangement, an influence of a fifth-order spherical aberration which is generated at the time of correcting a third-order spherical aberration can be minimized by defining the optimal substrate thickness T of the objective lens in such a manner as to satisfy the above formulas.

An optical head device according to another aspect of the invention includes: a first light source for emitting a first light beam; a second light source for emitting a second light beam having a wavelength longer than a wavelength of the first light beam; a third light source for emitting a third light beam having a wavelength longer than the wavelength of the second light beam; a light flux separating section for selectively reflecting or transmitting the first light beam, the second light beam, and the third light beam to be incident in an identical direction; a first objective lens for collecting the first light beam transmitted through the light flux separating section on a first optical information recording medium, and having a first numerical aperture; a second objective lens for collecting the second light beam reflected on the light flux separating section on a second optical information recording medium, for collecting the third light beam reflected on the light flux separating section on a third optical information recording medium, and having a second numerical aperture different from the first numerical aperture; and an aberration corrector disposed between the first light source and the light flux separating section, and for correcting a third-order spherical aberration which is generated depending on a thickness of a light transmissive layer from a surface of the first optical information recording medium, corresponding to an optimal substrate thickness of the first objective lens, to an intended information recording surface, assuming that the light transmissive layer thickness of the first optical information recording medium which minimizes a residual third-order spherical aberration at the time of incidence of parallel light into the first objective lens is defined as the optimal substrate thickness of the first objective lens. The first objective lens and the second objective lens are disposed in the order of the second objective lens and the first objective lens from an incident side of the first light beam, the second light beam, and the third light beam, along a direction tangential to the first optical information recording medium, the second optical information recording medium, and the third optical information recording medium. The optimal substrate thickness of the first objective lens is defined in such a manner that a variation of a third-order astigmatism which is generated on the information recording surface of the first optical information recording medium farthest from the first objective lens at the time of correcting the third-order spherical aberration, and a variation of a third-order astigmatism which is generated on the information recording surface of the first optical information recording medium closest to the first objective lens at the time of correcting the third-order spherical aberration are set equal to each other.

According to the above arrangement, the optimal substrate thickness of the first objective lens is defined in such a manner that a variation of a third-order astigmatism which is generated on the information recording surface of the first optical information recording medium farthest from the first objective lens at the time of correcting the third-order spherical aberration, and a variation of a third-order astigmatism which is generated on the information recording surface of the first optical information recording medium closest to the first objective lens at the time of correcting the third-order spherical aberration are set equal to each other. Accordingly, an influence of a third-order astigmatism which is generated at the time of correcting a third-order spherical aberration can be suppressed, and satisfactory information recording and/or reproducing can be performed.

In the optical head device, preferably, the optimal substrate thickness of the first objective lens may be defined in such a manner that a difference between the variation of the third-order astigmatism which is generated on the information recording surface of the first optical information recording medium farthest from the first objective lens at the time of correcting the third-order spherical aberration, and the variation of the third-order astigmatism which is generated on the information recording surface of the first optical information recording medium closest to the first objective lens at the time of correcting the third-order spherical aberration is set to 10 mλ or less.

According to the above arrangement, the optimal substrate thickness of the first objective lens is defined in such a manner that a difference between the variation of the third-order astigmatism which is generated on the information recording surface of the first optical information recording medium farthest from the first objective lens at the time of correcting the third-order spherical aberration, and the variation of the third-order astigmatism which is generated on the information recording surface of the first optical information recording medium closest to the first objective lens at the time of correcting the third-order spherical aberration is set to 10 mλ or less. Accordingly, an influence of a third-order astigmatism which is generated at the time of correcting a third-order spherical aberration can be minimized, and satisfactory information recording and/or reproducing can be performed.

In the optical head device, preferably, the light flux separating section may include a wavelength selecting section for transmitting the first light beam, and reflecting the second light beam and the third light beam, and assuming that the numerical aperture of the first light beam to be incident into the wavelength selecting section at the time of correcting the third-order spherical aberration on the information recording surface of the first optical information recording medium farthest from the first objective lens is $NA_h$, and the numerical aperture of the first light beam to be incident into the wavelength selecting section at the time of correcting the third-order spherical aberration on the information recording surface of the first optical information recording medium closest to the first objective lens is $NA_s$, preferably, the optimal head device may satisfy the following formula:

$$(NA_h)^2 \approx (NA_s)^2$$

According to the above arrangement, the numerical aperture $NA_h$ of the first light beam to be incident into the wavelength selecting section at the time of correcting the third-order spherical aberration on the information recording surface of the first optical information recording medium farthest from the first objective lens, and the numerical aperture $NA_s$ of the first light beam to be incident into the wavelength selecting section at the time of correcting the third-order spherical aberration on the information recording surface of the first optical information recording medium closest to the first objective lens satisfy the above formula. This enables to equally distribute an influence of a third-order astigmatism which is generated when light is transmitted through the wavelength selecting section with respect to the light transmissive layers, and suppress an influence of the third-order astigmatism.

In the optical head device, preferably, the first optical information recording medium may have two information recording surfaces, the light transmissive layer thickness of the information recording surface of the first optical information recording medium farthest from the first objective lens may be 95 μm or more, and the light transmissive layer thickness of the information recording surface of the first optical information recording medium closest to the first objective lens may be 80 μm or less.

According to the above arrangement, satisfactory information recording and/or reproducing can be performed, using the first optical information recording medium having two information recording surfaces, the light transmissive layer thickness of the information recording surface farthest from the first objective lens of 95 μm or more, and the light transmissive layer thickness of the information recording surface closest to the first objective lens of 80 μm or less.

In the optical head device, preferably, the optical information recording medium may have three or more information recording surfaces, the light transmissive layer thickness of the information recording surface of the optical information recording medium farthest from the objective lens may be 95 μm or more, and the light transmissive layer thickness of the information recording surface of the optical information recording medium closest to the objective lens may be 75 μm or less.

According to the above arrangement, satisfactory information recording and/or reproducing can be performed, using the optical information recording medium having three or more information recording surfaces, the light transmissive layer thickness of the information recording surface farthest from the objective lens of 95 μm or more, and the light transmissive layer thickness of the information recording surface closest to the objective lens of 75 μm or less.

In the optical head device, preferably, the aberration corrector may include a collimator lens.

The above arrangement enables to correct a third-order spherical aberration which is generated depending on the thickness of a light transmissive layer from a surface of the optical information recording medium, corresponding to the optimal substrate thickness of the objective lens, to an intended information recording surface, using the collimator lens.

A recording and/or reproducing device according to another aspect of the invention includes: the optical head device having any one of the above arrangements; a rotating section for rotatably driving the optical information recording medium; and a controlling section for controlling the optical head device to perform information recording and/or reproducing with respect to the optical information recording medium.

According to the above arrangement, since the recording and/or reproducing device includes the optical head device having any one of the above arrangements, an influence of a wavefront aberration which is generated at the time of correcting a third-order spherical aberration can be suppressed, and satisfactory information recording and/or reproducing can be performed.

INDUSTRIAL APPLICABILITY

The invention enables to suppress an influence of a fifth-order spherical aberration or a third-order astigmatism which is generated at the time of correcting a third-order spherical aberration, and accordingly, is useful as an optical head device, a recording and/or reproducing device, and the like for recording and/or reproducing information on or from an optical information recording medium having a multilayer structure of information recording surfaces.

The invention claimed is:

1. An optical head device comprising:
a first light source for emitting a first light beam;
a second light source for emitting a second light beam having a wavelength longer than a wavelength of the first light beam;
a third light source for emitting a third light beam having a wavelength longer than the wavelength of the second light beam;

a light flux separating section for selectively reflecting or transmitting the first light beam, the second light beam, and the third light beam to be incident in an identical direction;

a first objective lens for collecting the first light beam transmitted through the light flux separating section on a first optical information recording medium, and having a first numerical aperture;

a second objective lens for collecting the second light beam reflected on the light flux separating section on a second optical information recording medium, for collecting the third light beam reflected on the light flux separating section on a third optical information recording medium, and having a second numerical aperture different from the first numerical aperture; and an aberration corrector disposed between the first light source and the light flux separating section, and for correcting a third-order spherical aberration which is generated depending on a thickness of a light transmissive layer from a surface of the first optical information recording medium, corresponding to an optimal substrate thickness of the first objective lens, to an intended information recording surface, assuming that the light transmissive layer thickness of the first optical information recording medium which minimizes a residual third-order spherical aberration at the time of incidence of parallel light into the first objective lens is defined as the optimal substrate thickness of the first objective lens, wherein the first objective lens and the second objective lens are disposed in the order of the second objective lens and the first objective lens from an incident side of the first light beam, the second light beam, and the third light beam, along a direction tangential to the first optical information recording medium, the second optical information recording medium, and the third optical information recording medium, and the optimal substrate thickness of the first objective lens is defined in such a manner that a variation of a third-order astigmatism which is generated on the information recording surface of the first optical information recording medium farthest from the first objective lens at the time of correcting the third-order spherical aberration, and a variation of a third-order astigmatism which is generated on the information recording surface of the first optical information recording medium closest to the first objective lens at the time of correcting the third-order spherical aberration are set equal to each other.

2. The optical head device according to claim 1, wherein the optimal substrate thickness of the first objective lens is defined in such a manner that a difference between the variation of the third-order astigmatism which is generated on the information recording surface of the first optical information recording medium farthest from the first objective lens at the time of correcting the third-order spherical aberration, and the variation of the third-order astigmatism which is generated on the information recording surface of the first optical information recording medium closest to the first objective lens at the time of correcting the third-order spherical aberration is set to 10 m$\lambda$ or less.

3. The optical head device according to claim 1, wherein the light flux separating section includes a wavelength selecting section for transmitting the first light beam, and reflecting the second light beam and the third light beam, and assuming that the numerical aperture of the first light beam to be incident into the wavelength selecting section at the time of correcting the third-order spherical aberration on the information recording surface of the first optical information recording medium farthest from the first objective lens is $NA_h$, and the numerical aperture of the first light beam to be incident into the wavelength selecting section at the time of correcting the third-order spherical aberration on the information recording surface of the first optical information recording medium closest to the first objective lens is $NA_s$ the optimal head device satisfies the following formula:

$$(NA_h)^2 \approx (NA_s)^2.$$

4. The optical head device according to claim 1, wherein the first optical information recording medium has two information recording surfaces, and the light transmissive layer thickness of the information recording surface of the first optical information recording medium farthest from the first objective lens is 95 μm or more, and the light transmissive layer thickness of the information recording surface of the first optical information recording medium closest to the first objective lens is 80 μm or less.

5. The optical head device according to claim 1, wherein the first optical information recording medium has three or more information recording surfaces, and the light transmissive layer thickness of the information recording surface of the first optical information recording medium farthest from the first objective lens is 95 μm or more, and the light transmissive layer thickness of the information recording surface of the first optical information recording medium closest to the first objective lens is 75 μm or less.

6. The optical head device according to claim 1, wherein the aberration corrector includes a collimator lens.

7. A recording and/or reproducing device comprising:
the optical head device of claim 1;
a rotating section for rotatably driving the optical information recording medium; and
a controlling section for controlling the optical head device to perform information recording and/or reproducing with respect to the optical information recording medium.

* * * * *